US010025977B2

(12) United States Patent
Rouh et al.

(10) Patent No.: US 10,025,977 B2
(45) Date of Patent: Jul. 17, 2018

(54) METHOD FOR IDENTIFYING A SIGN ON A DEFORMED DOCUMENT

(71) Applicant: MORPHO, Issy-les-Moulineaux (FR)

(72) Inventors: Alain Rouh, Issy les Moulineaux (FR); Jean Beaudet, Issy les Moulineaux (FR); Laurent Rostaing, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 29 days.

(21) Appl. No.: 14/878,837

(22) Filed: Oct. 8, 2015

(65) Prior Publication Data
US 2016/0104039 A1    Apr. 14, 2016

(30) Foreign Application Priority Data
Oct. 10, 2014    (FR) ..................... 14 59742

(51) Int. Cl.
*G06K 9/00*    (2006.01)
*G06T 7/60*    (2017.01)
(Continued)

(52) U.S. Cl.
CPC ..... *G06K 9/00442* (2013.01); *G06K 9/00463* (2013.01); *G06K 9/3275* (2013.01);
(Continued)

(58) Field of Classification Search
None
See application file for complete search history.

(56) References Cited

U.S. PATENT DOCUMENTS

| 5,940,534 | A | 8/1999 | Wakahara et al. |
| 6,606,421 | B1 * | 8/2003 | Shaked ............ G06K 5/00 382/275 |

(Continued)

FOREIGN PATENT DOCUMENTS

| WO | WO-0105140 | 1/2001 |
| WO | WO-2006130012 | 12/2006 |

OTHER PUBLICATIONS

French Search Report, dated Jul. 7, 2015, French Application No. 1459742.
(Continued)

*Primary Examiner* — Matthew Bella
*Assistant Examiner* — Soo Shin
(74) *Attorney, Agent, or Firm* — Womble Bond Dickinson (US) LLP (57) ABSTRACT

This invention relates to a method for identifying a sign on an image of a document that can be deformed comprising:
an acquisition (E1) of said digital image of said document;
a determination (E2) in the acquired image of at least one candidate sign region using an image segmentation algorithm,
for each candidate sign region, a calculation (E3) of a signature comprising a piece of information concerning the location in the acquired image of said candidate sign region and a region descriptor concerning the local characteristics of the image in said region,
an identification (E4) of a sign on the image of the document using the calculated signatures comprising jointly a comparison (E41) of the calculated signatures with reference signatures concerning sign regions of document models, said comparison being carried out according to a geometric deformation model of said document, and an estimation (E42) according to said comparison of said geometric deformation model.

11 Claims, 10 Drawing Sheets

(51) Int. Cl.
  *G06K 9/62* (2006.01)
  *G06K 9/36* (2006.01)
  *G06K 9/32* (2006.01)
  *G06K 9/20* (2006.01)
  *G06T 7/11* (2017.01)

(52) U.S. Cl.
  CPC ............ *G06K 9/36* (2013.01); *G06K 9/6202* (2013.01); *G06K 9/6215* (2013.01); *G06T 7/11* (2017.01); *G06T 7/60* (2013.01); *G06K 9/2063* (2013.01); *G06K 2009/363* (2013.01)

(56) References Cited

U.S. PATENT DOCUMENTS

| | | | | |
|---|---|---|---|---|
| 8,345,979 B2* | 1/2013 | Davis | .................... | G06T 7/0079 382/181 |
| 2008/0075328 A1* | 3/2008 | Sciammarella | ........ | G01B 11/25 382/108 |
| 2009/0016606 A1* | 1/2009 | Meyer | .................. | G06K 9/3283 382/176 |
| 2013/0129151 A1* | 5/2013 | Rodriguez Serrano | ................ | G06K 9/6217 382/105 |
| 2013/0129152 A1* | 5/2013 | Rodriguez Serrano | ................ | G06K 9/6255 382/105 |
| 2014/0247470 A1 | 9/2014 | Hunt et al. | | |

OTHER PUBLICATIONS

Lee, Seong-Whan, et al., "Nonlinear Shape Restoration of Distorted Images with Coons Transformation", *Document Analysis and Recognition, 1995, Proceedings of the Third International Conference on Montreal, Que., Canada* Aug. 14-16, 1995, Los Alamitos, CA, USA, IEEE Comput. Soc, US, vol. 1, (Aug. 14, 1995), 235-238.

* cited by examiner

METHOD FOR IDENTIFYING A SIGN ON A DEFORMED DOCUMENT

GENERAL TECHNICAL FIELD

This invention relates to the field of detecting and identifying signs. More precisely, it relates to a method for identifying at least one sign on one or several images of a document that may be deformed, in particular on a game ticket such as a lottery ticket.

PRIOR ART

Many existing procedures can use documents comprising boxes to be filled in or to be ticked in order to question a person, for example to have the person complete a form, answer examination questions, or to allow the person to participate in a game such as a lottery. Methods have as such been proposed in order to detect and identify the position and the content of signs, such as boxes, on a document submitted by a user for automated reading. Many of these methods, such as those disclosed by patent applications U.S. Pat. No. 5,140,139 or US2008/0311551 use OCR ("Optical Character Recognition") or OMR ("Optical Mark Recognition") techniques in order to find the position of a box in the document using a document model and to determine the content of such a box. Such methods are able to take into account some variation in the positioning of the submitted document with respect to the known document model, such as a rotation or an enlargement. These methods are however sensitive to any deformations of the submitted document, such as a folding or a wrinkling, which are able to vary the relative position of the boxes to be detected in relation to one another. Systems have as such been proposed comprising a device that makes it possible to carry out a mechanical unwrinkling of the document before it is processed. Such devices are effective but are generally complex, cumbersome and substantially increase the cost of the reading systems. They can also complicate the use of the system, for example by introducing the risk of paper jamming in the unwrinkling device, and do not make it possible to capture an image of the document remotely, without inserting it into the reading system.

In order to overcome these disadvantages certain methods, such as the one described in patent application EP 2713315, propose to detect the signs of a document via template matching. Images of signs of small dimensions such as a box or a portion of a box, pre-recorded using a document model, are searched for in an image of the submitted document. The resemblance of a zone of the image of the document with images of pre-recorded signs is estimated by a correlation calculation. Such methods are less sensitive than the aforementioned methods without mechanical unwrinkling to deformations that affect the document as a whole, such as a folding, but are sensitive to the variations that modify the result of the correlation calculations such as differences in brightness, contrast or deformations that modify the aspect of a box such as wrinkling or the effects of perspective.

Other methods, such as the one described in patent FR 2952218, propose to carry out an unwrinkling of the submitted document via software, in order to determine a virtual image of the deformed document. Such methods however require substantial calculating power and can require a system that is more complex than a simple image-capturing device, for example in order to project patterns onto the wrinkled document required for the calculation of software unwrinkling.

There is therefore a need for a method that makes it possible to identify signs on a wrinkled document, using a simple imaging device that does not comprise mechanical unwrinkling or a projection system, without being sensitive to the variations in light and to the local deformations that the document is subjected to.

PRESENTATION OF THE INVENTION

This invention propose according to a first aspect a method for identifying at least one sign on at least one image of a document that can be deformed,
said method being implemented by a data processing device able to be connected to a first storage device and characterised in that it comprises steps of:
    acquiring said at least one digital image of said document;
    determining in the acquired image at least one sub-part of the image acquired, referred to as candidate sign region, using an image segmentation algorithm,
    for each candidate sign region, calculating a signature comprising a piece of information concerning the location in the acquired image of said candidate sign region and a region descriptor concerning the local characteristics of the image in said region,
    identifying at least one sign on said at least one image of said document using the calculated signatures,
    said step of identifying comprising jointly a comparison of the calculated signatures with reference signatures concerning sign regions of document models stored in the first storage device, said comparison being carried out according to a geometric deformation model of said document, and an estimation according to said comparison of said geometric deformation model.

Such an implementation makes it possible to locate and identify in the document signs from an image that can possibly be taken remotely. Jointly carrying out the comparison of the signatures and determining the deformation model makes it possible to obtain a model that indeed represents the deformations of the document but also to set aside the candidate sign regions that are not coherent with this model and which therefore manifestly do not correspond to a sign to be identified. Using a complex deformation model makes it possible to not limit the method to the taking into account of simple deformations of the document such as deformations in perspective and makes it possible to identify signs despite any wrinkling whatsoever of the document, without having to unwrinkle the document mechanically or by means of software.

According to an embodiment, for each candidate sign region:
    said step of comparing can comprise:
    a comparison of the signature calculated for said region with said reference signatures stored in said first storage device,
    a putting into correspondence of the calculated signature with a reference signature according to said comparison and to a geometric deformation model of the current document stored in a second storage device connected to said data processing device, in such a way as to identify said candidate sign region,
    and said step of estimating can comprise:
    an estimating of a new geometric deformation model of said document from said current geometric deformation model and from said correspondence, a storing in the second storage device of said new deformation model as a current deformation model.

Such a joint and iterative determining of the correspondences between regions and of deformation model of the document makes it possible to minimise the risks of incorrect association by updating the model after each new putting into correspondence.

Such a document can be a game ticket or an identity document.

Such a sign to be identified can be a geometric figure, a character, a group of characters or a graphical element.

Such a sign to be identified can also be a pattern delimited by a closed contour.

Such a sign to be identified can in particular be a box, a circle, a star or an alphanumeric character or a specific pattern of the issuing country of an identity document.

Such an implementation makes it possible to automatically identify the boxes of a game ticket or the characters that locate a particular piece of information in the processed document, such as an identity document, in such a way as to read the latter automatically despite its deformations.

According to an alternative, a signature can further comprise information on the scale.

When a similar pattern is repeated with different sizes in a document, this alternative avoids an incorrect association between two regions of different sizes.

A descriptor of a sign region can concern information on the contour and/or on the content of said sign region.

Such a descriptor makes it possible to take advantage of both the shape of the contour and of the content of a region in order to identify it in relation to a reference document, for example by taking into account numbers mentioned in the background of the boxes of a game ticket in order to differentiate them from one another.

The use of such descriptors makes it possible to render the process of associating a candidate sign region with a sign region of a document model relatively independent from the conditions of capturing the image of the document or of the deformations of the latter, while still contributing to limit the number of erroneous associations.

Such a deformation model can be determined using an inverse distance weighting algorithm or an splines interpolation algorithm.

Such algorithms make it possible to effectively determine via interpolation a deformation model of the document from associations determined for a limited quantity of pairs of sign regions.

According to a second aspect, the invention relates to a computer programme product comprising code instructions for the executing of a method of identification according to the first aspect when this programme is executed by a processor.

According to a third aspect, the invention relates to a device for identifying at least one sign on at least one image of a document that can be deformed,
characterised in that it comprises a data processing device able to be connected to a first storage device comprising:

a module for acquiring said at least one digital image of said document;

a module for determining in the acquired image at least one sub-part of the image acquired, referred to as candidate sign region, using an image segmentation algorithm, a module for calculating a signature for each candidate sign region comprising a piece of information concerning the location in the acquired image of said candidate sign region and a region descriptor concerning the local characteristics of the image in said region, a module for identifying at least one sign on said at least one image of said document using the calculated signatures, said module for identifying comprising a module for comparing the calculated signatures with reference signatures concerning sign regions of document models stored in said first storage device, according to a geometric deformation model of said document, and a module for the joint estimation of said geometric deformation model according to said comparison.

Such computer programme product and identification device have the same advantages as those mentioned for the method according to the first aspect.

PRESENTATION OF THE FIGURES

Other characteristics and advantages of this invention shall appear when reading the following description of a preferred embodiment. This description shall be given in reference to the annexed drawings wherein.

DETAILED DESCRIPTION

Figure 1:
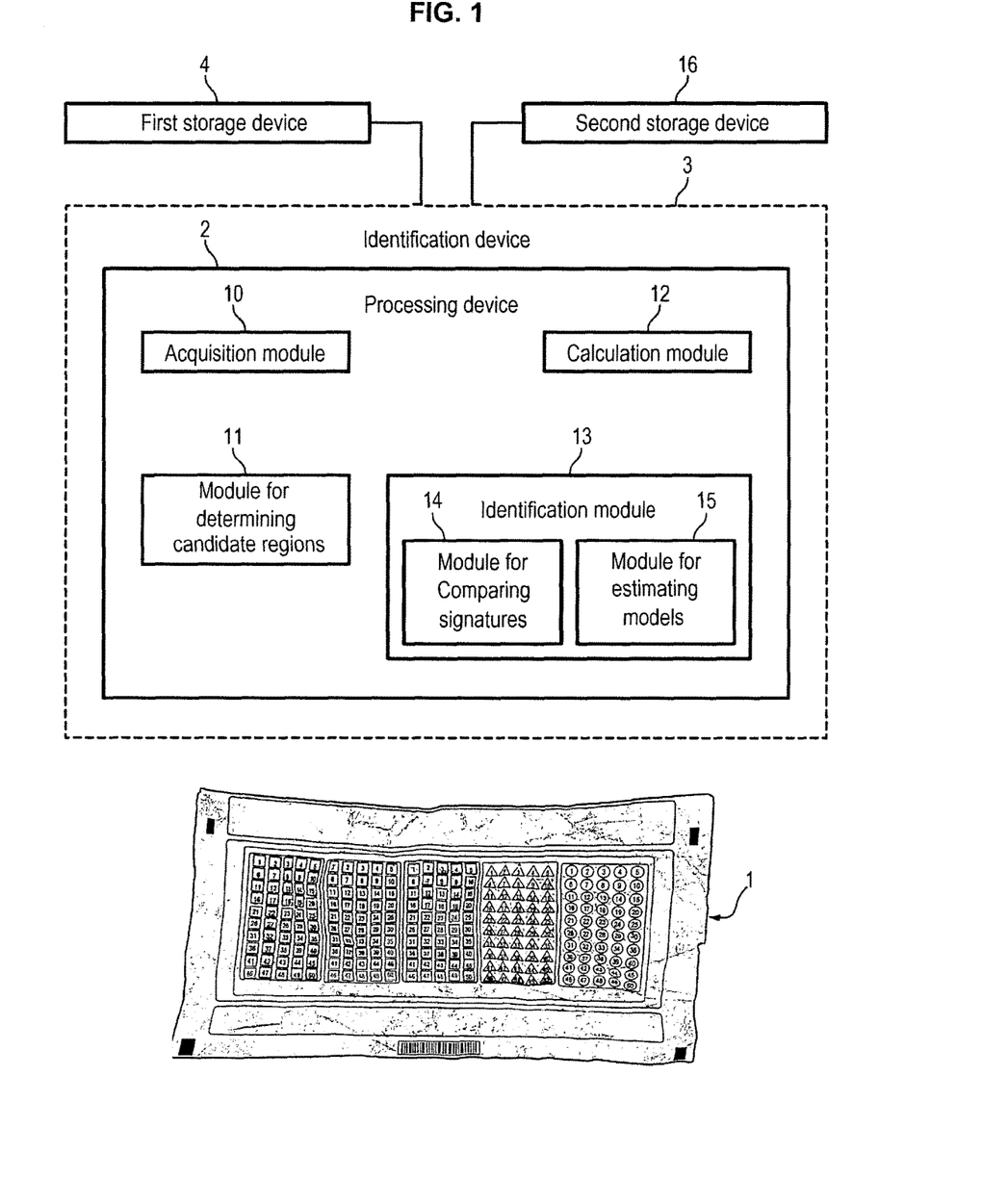
FIG. 1 shows a system for identifying according to an embodiment of the invention.

This invention relates to an implementation of a method for identifying at least one sign on at least one image of a document that can be deformed 1 by a processing device 2 included in an identification device 3 such as shown in FIG. 1 able to be connected to a first storage device 4.

Such documents are for example identity documents such as passports, identity cards or driving licenses, forms, examination MCQs or game tickets, in particular lottery bulletins comprising boxes to be ticked. The document to be processed comprises at least one sign to be identified. Such a sign can be a geometric figure such as a box, a circle or a star, or a character such as an alphanumeric character, or a group of characters, or a graphical element such as a specific pattern of the issuing country of an identity document.

Figure 2:
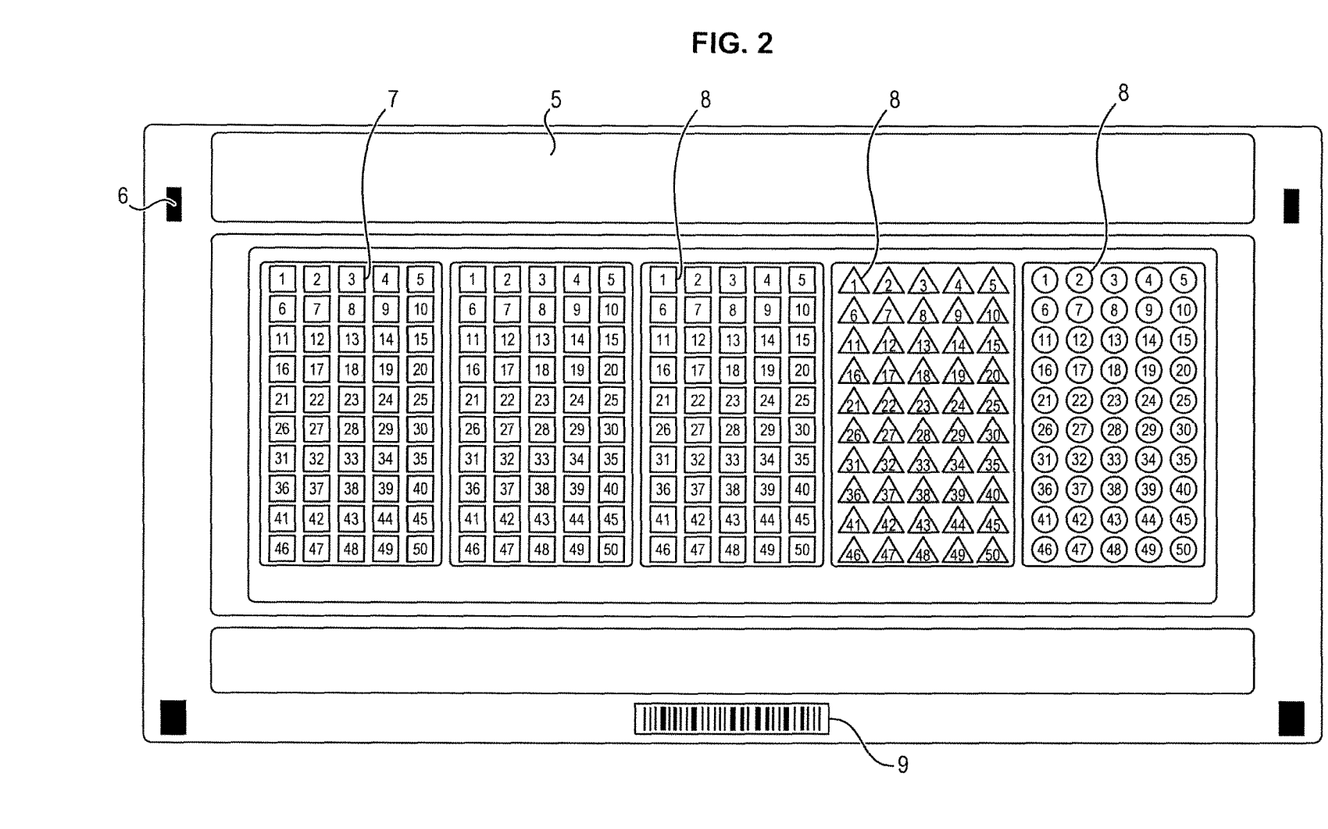
FIG. 2 shows an example of a lottery ticket for which the method according to the invention is implemented.

The example of a lottery bulletin is shown in FIG. 2. Such a bulletin can comprise decorative elements 5, positioning marks 6, grids 7, boxes 8 and a game code 9. A box shall refer to a pattern that has any closed contour, delimiting a space intended to be filled in by a user. Such a contour can be located by a line or by a difference in shading between the background of the box and the rest of the bulletin. In the example shown in FIG. 2, certain boxes have a closed square contour and other boxes have a closed contour with a star shape. Boxes can also have a content such as a digit such as shown in FIG. 2.

In the case of a document such as a passport, the signs to be identified can be characters or alphanumeric character strings that consist of letters, digits or special characters such as dashes, or a graphical element of the document such as a specific pattern of the issuing country. The identification in such a document, by comparing with reference signatures, of signs such as recurring character strings from one document to another, such as the labels (last name, first name, etc.) of the fields of the document or the place of birth, makes it possible to identify these signs with a robustness that is stronger than with conventional OCR methods.

Figure 3A:
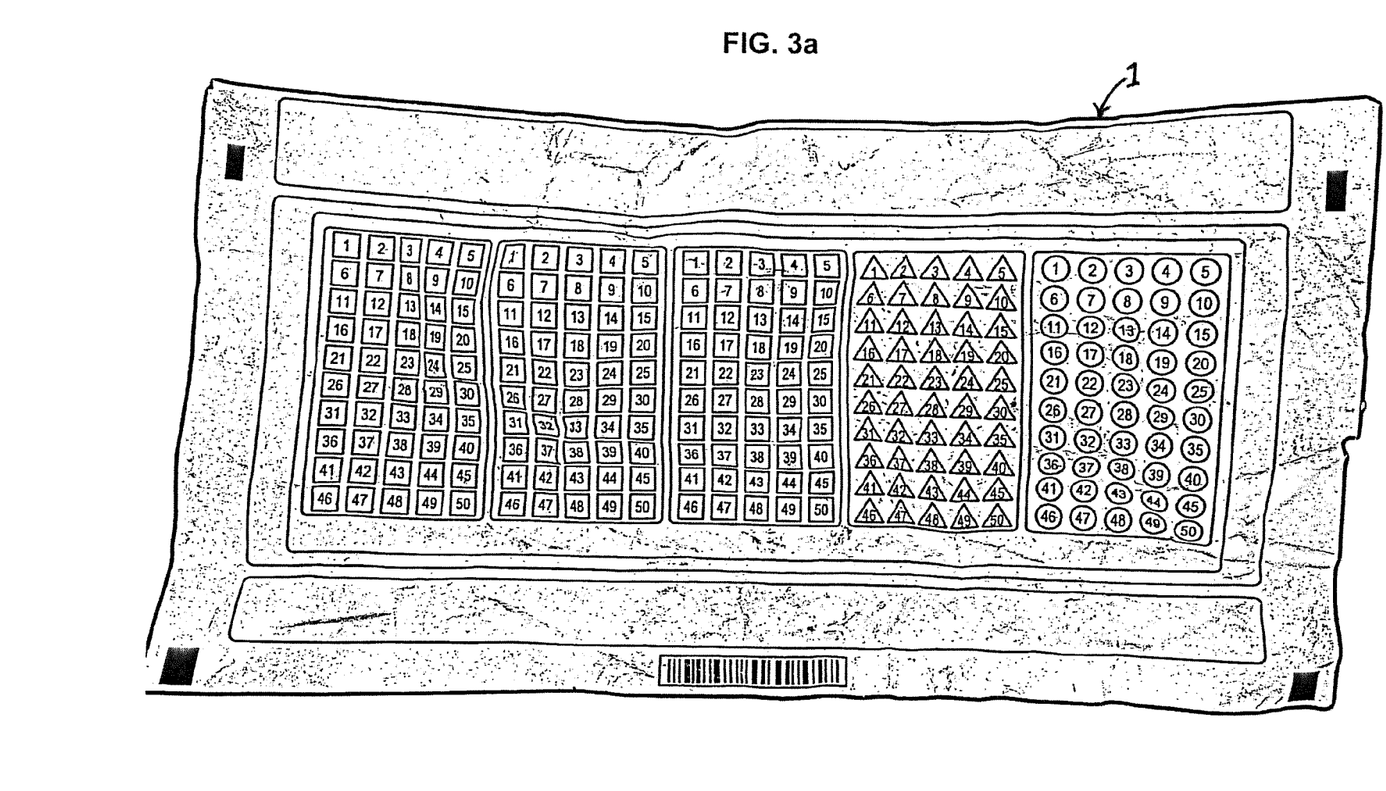
FIGS. 3a, 3b and 3c show the various types of physical deformation that a document can be subjected to for which the method according to the invention is implemented.
Figure 3B:
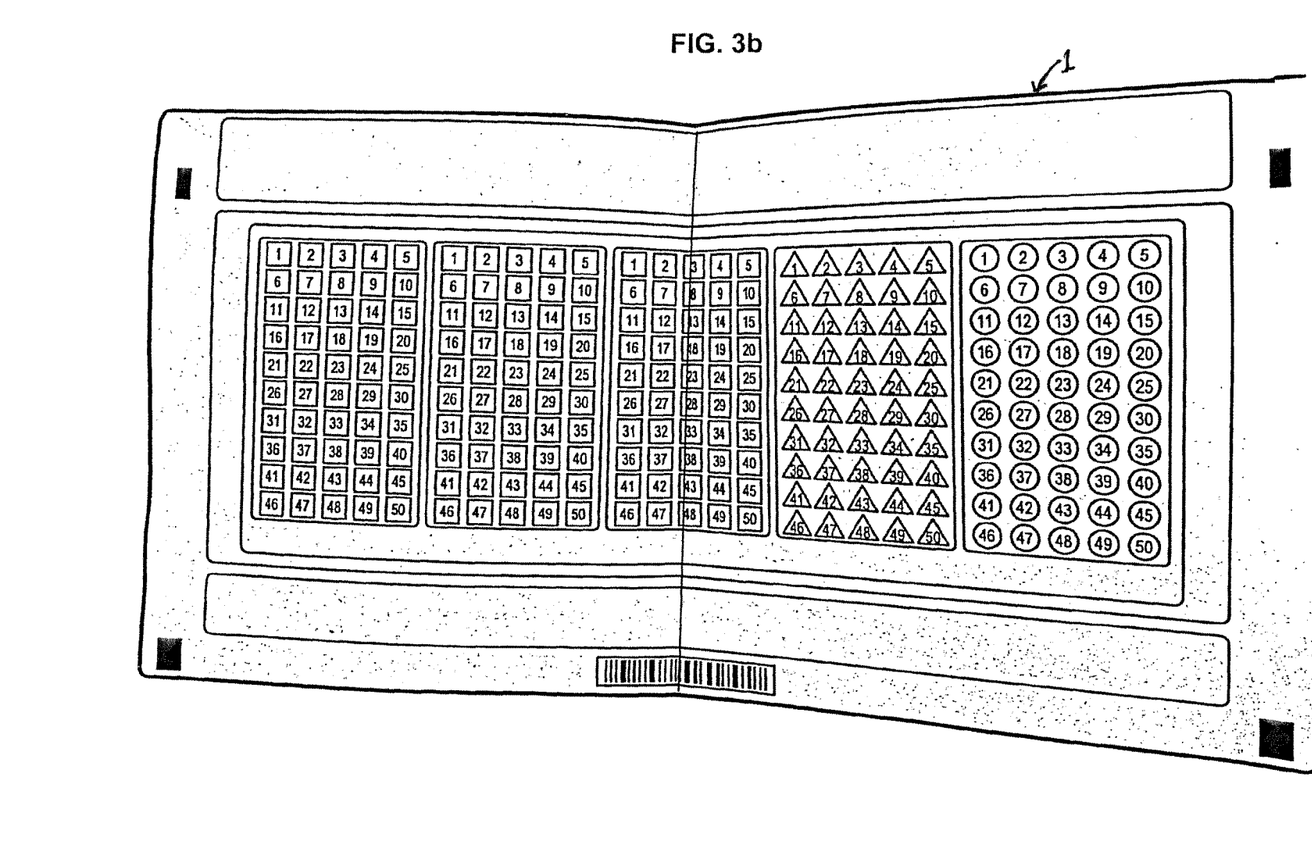
Figure 3C:
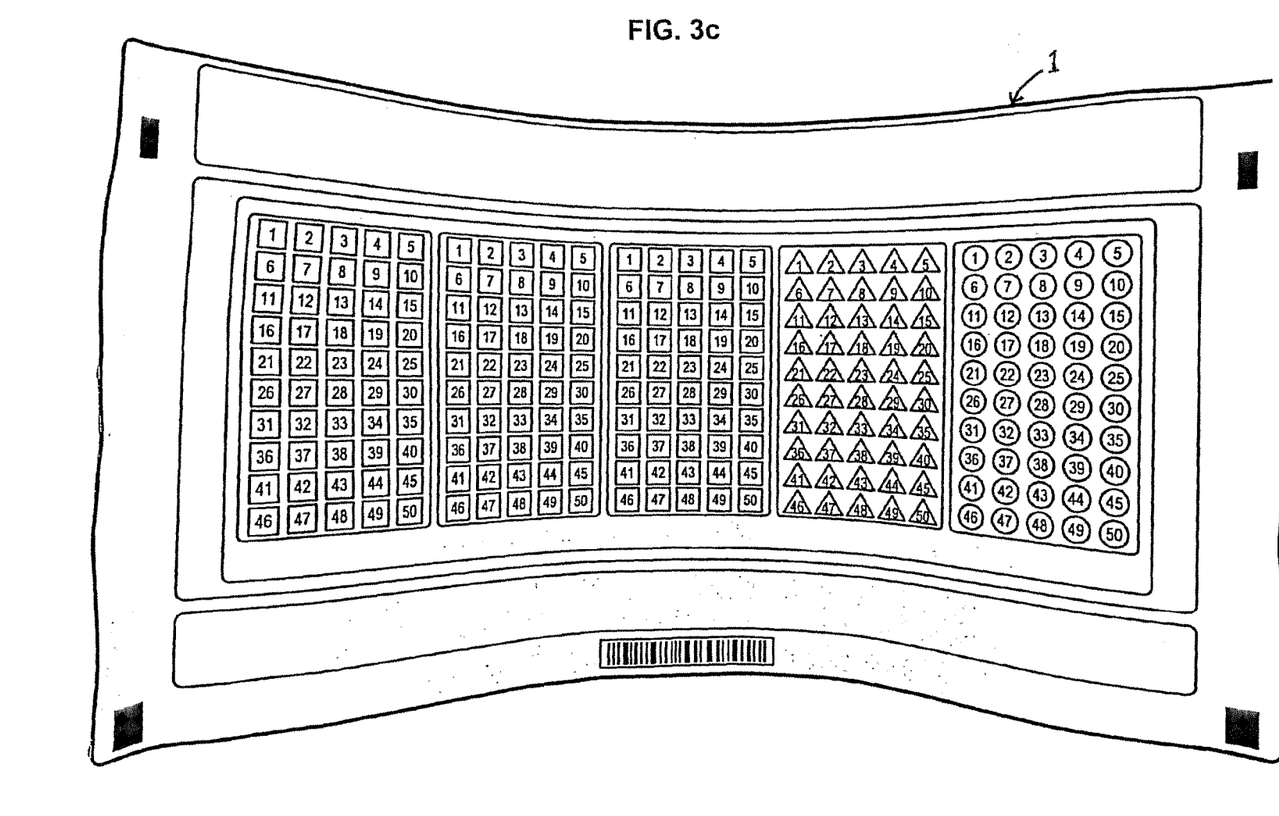

Such a document can have physical deformations of several types as shown in FIGS. 3a to 3c resulting from the handling of the document by the user. Such deformations can for example be wrinkling as shown in FIG. 3a, folds as shown in FIG. 3b or bends as shown in FIG. 3c.

The document that is able to be deformed conforms to a predefined document model. Such a document model defines a geometric arrangement of the signs that comprise it, i.e. the theoretical position of the signs, characters or boxes that it is comprised of when the document is not physically deformed.

Figure 4:
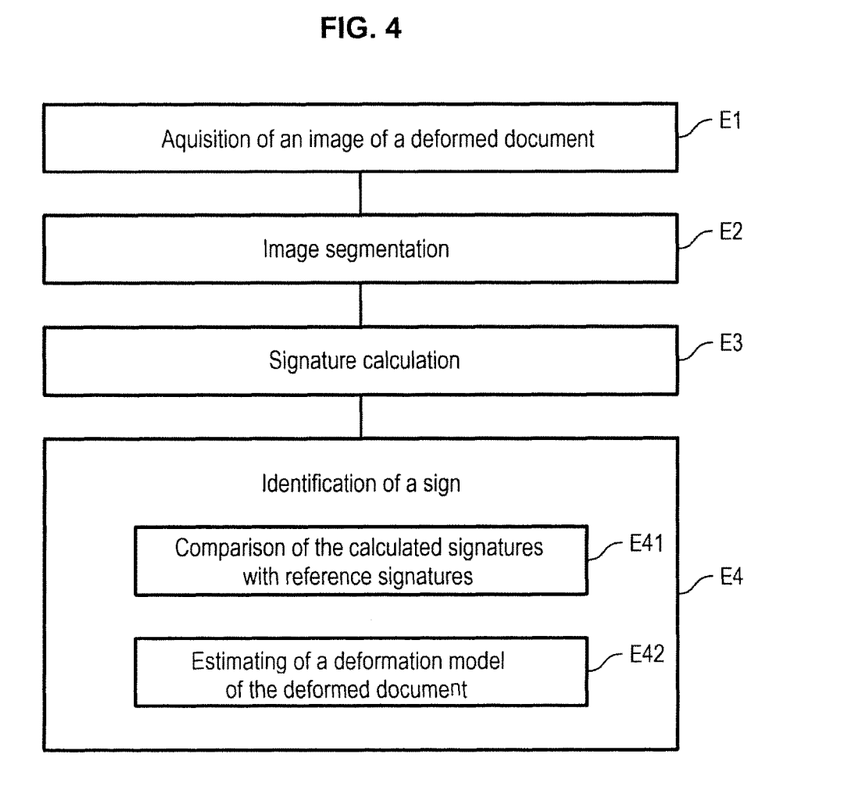
FIG. 4 diagrammatically shows an implementation of a method for identifying a sign according to the invention.

FIG. 1 shows an identification device configured to identify at least one sign on at least one image of such a document by implementing a method of identification described in reference to FIG. 4. This method proposes to identify these signs on the at least one image of the document that can be deformed from an acquired image of the wrinkled document, without requiring unwrinkling, and using a pre-recorded document model corresponding to the wrinkled document.

For this, the identification device comprises a module for acquiring 10 configured to acquire a digital image of said document during a step of acquiring E1. Such a module for acquiring can comprise a device for capturing an image such as a camera, a video camera or a scanner. This module for acquiring is configured to acquire a digital image of the document, for example in the form of a matrix of pixels, that reproduces the possible physical geometric deformations of the document. Such an image can also include geometric deformations produced by the perspective projection carried out by the module for acquiring. Such an acquisition only requires presenting the document to be processed in the field for capturing images of the module for acquiring, and does not require that the document be placed in contact with the identification device, for example by being inserted into the device or placed flat on an imaging surface.

The identification device further comprises a module for determining candidate sign regions 11. Such a module for determining candidate sign regions is configured in order to determine in the acquired image at least one sub-part of the acquired image, referred to as candidate sign region, using an image segmentation algorithm during a step of segmenting E2.

Figure 5A:
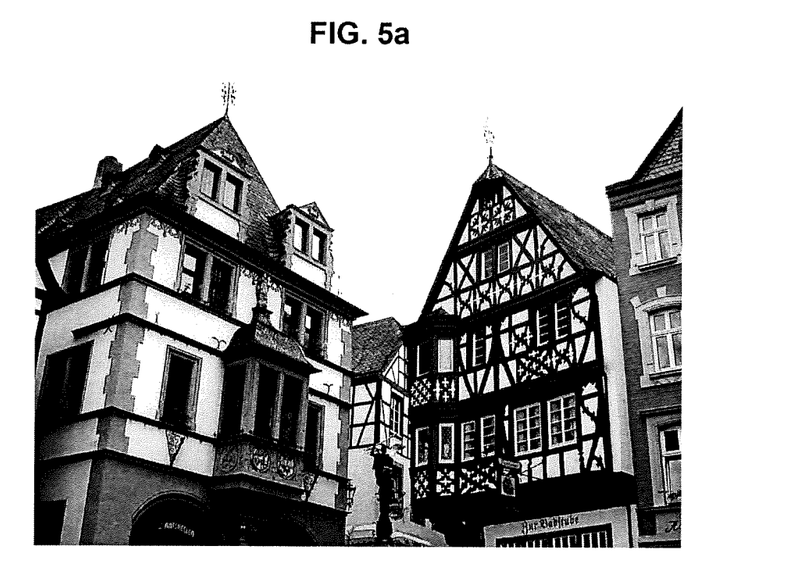
FIGS. 5a and 5b show an example of a result of a segmentation algorithm that can be implemented by the method according to the invention.
Figure 5B:
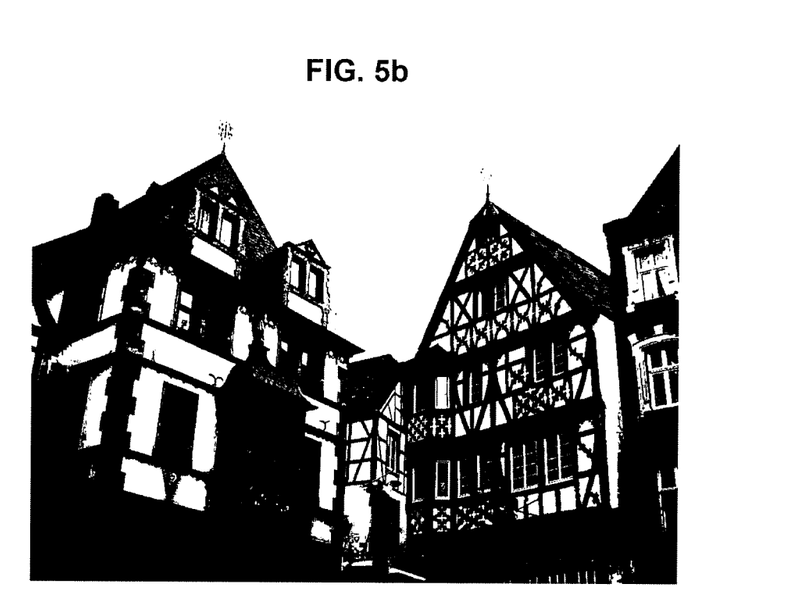

Such a segmentation algorithm can implement a thresholding of the pixels of the image of said document, for example according to their brightness, their level of grey or their colour. Such a thresholding can be a simple thresholding that compares the pixels of the image with a single threshold and that separates them into two groups of pixels. Such a segmentation can be represented in the form of a black and white image such as shown in FIGS. 5a and 5b. The segmentation algorithm can then comprise a connected components analysis in order to determine in the image connected pixel regions of the image that have the same characteristics. Two pixels can for example be considered as connected if they are adjacent horizontally or vertically in the matrix of the pixels of the image for 4-connectivity, or also diagonally for 8-connectivity.

Such a segmentation algorithm can also evaluate several hypotheses of segmentations, for example according to the method of the tree of connected components, such as described in the document "A Baillard, C. Berger, . . . R. Levillain, N. Widynski, 2007, Aligorithme de calcul de l'arbre des composantes avec applications à la reconnaissance des formes en imagerie satellitaire, 21° Colloque GRETSI (11-14)". Each hypothesis of segmentation that corresponds to a node of the tree can then be evaluated according to various criteria relating to the object to be segmented, such as colorimetric criteria or geometric criteria, estimated for the group of pixels that corresponds to the connected component represented by the corresponding node of the tree. It is as such possible to select the best segmentation hypothesis according to the criteria considered, or to consider several segmentation hypotheses. The regions of connected pixels determined in the image by the segmentation algorithm constitute the candidate sign regions determined during the step of segmenting E2.

The segmentation algorithm can also determine the candidate sign regions using an algorithm of the MSER ("Maximally Stable Extremal Regions") type, of segmentation by region growth, by fusion and decomposition, or by contour detection.

The segmentation algorithm can also implement as a supplement to operations mentioned hereinabove, additional filtering operations, for example in order to increase the contrast of the image before it is processed or in order to carry out a selection of the connected components based on geometric criteria such as the area or a characteristic radius, or colorimetric criteria in order to suppress the regions of connected pixels that are of no interest for the identifying of signs.

Figure 6:
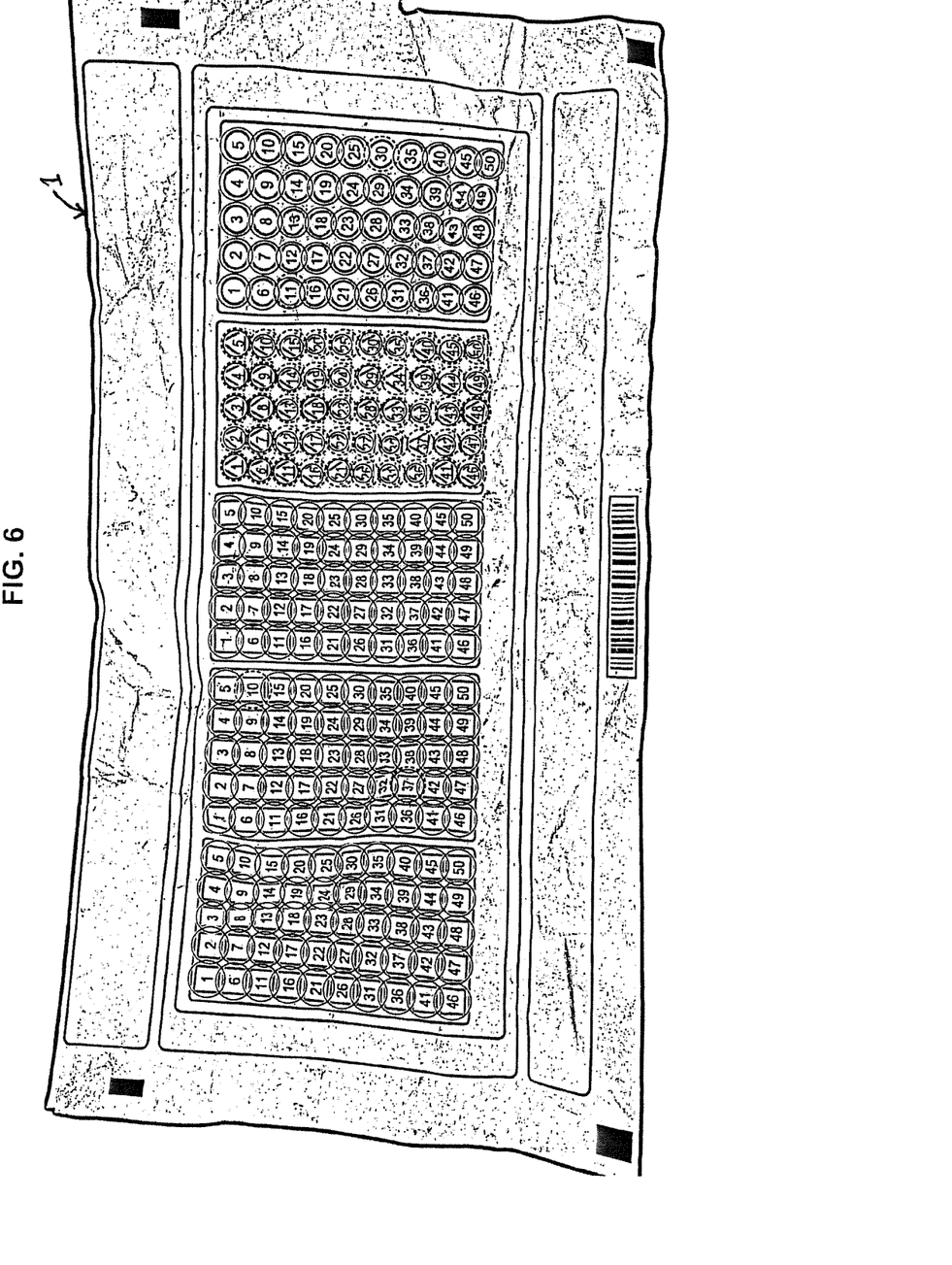
FIG. 6 shows another example of a result of an algorithm for segmentation of boxes that can be implemented by the method according to the invention.

In the case of a document with boxes, it is possible to adapt the segmentation algorithm in order to attempt to detect candidates box regions that correspond to the boxes of the document according to theirs contours but also according to their content, i.e. according to the pixels located inside the limits of the contour of a box, such as shown in FIG. 6. Such an approach can particularly be implemented when the inside of the boxes has a particular characteristic, such as a distinctive filling colour or a box number in the case of a lottery ticket. This will have for effect to render the detection of the boxes more robust.

Such a segmentation algorithm can lead to selecting candidate sign regions that do not in fact correspond to signs, for example to boxes or characters, but which correspond to other elements of the document such as decorative elements, the positioning marks of a lottery ticket or dirt deposited on the surface of the document. The candidate sign regions are not necessarily separate and certain pixels or groups of pixels can belong to several candidate sign regions.

The identification device also comprises a module for calculating 12 configured to calculate, during a step of calculating E3, a signature for each candidate sign region determined during the step of segmenting E2. Such a signature of a region can comprise a piece of information concerning the location of said region in the acquired image as well as a region descriptor concerning the local characteristics of the image in said region. Such a signature can furthermore comprise information on the scale.

The role of such a descriptor of a region is to describe the local characteristics of said region in a summarised manner. Such a descriptor is preferentially chosen so as to be invariant to changes in scale and to rotations and to be robust with respect to disturbances of the geometry or photometric characteristics of the image in the region such as a local affine transformation, a change in the point of view, the adding of noise, a modification in the illumination etc. Such an invariance can be obtained by normalisation of the image in the determined candidate regions or by normalisation of the descriptors themselves, generally at the price of a loss of information.

Such descriptors make it possible to effectively distinguish the candidate regions from one another, in a robust manner regarding the disturbances occurring in the acquisition of the image of the document. These descriptors as such make it possible to easily place the candidate regions in correspondence with the signs of a document model comprising various signs of known signatures stored in a storage device, with a low probability of error.

The descriptor of a sign region can concern information on the contour and/or on the content of said sign region. Such a descriptor can be pertinent in particular when the signs to be identified are boxes.

Figure 7:
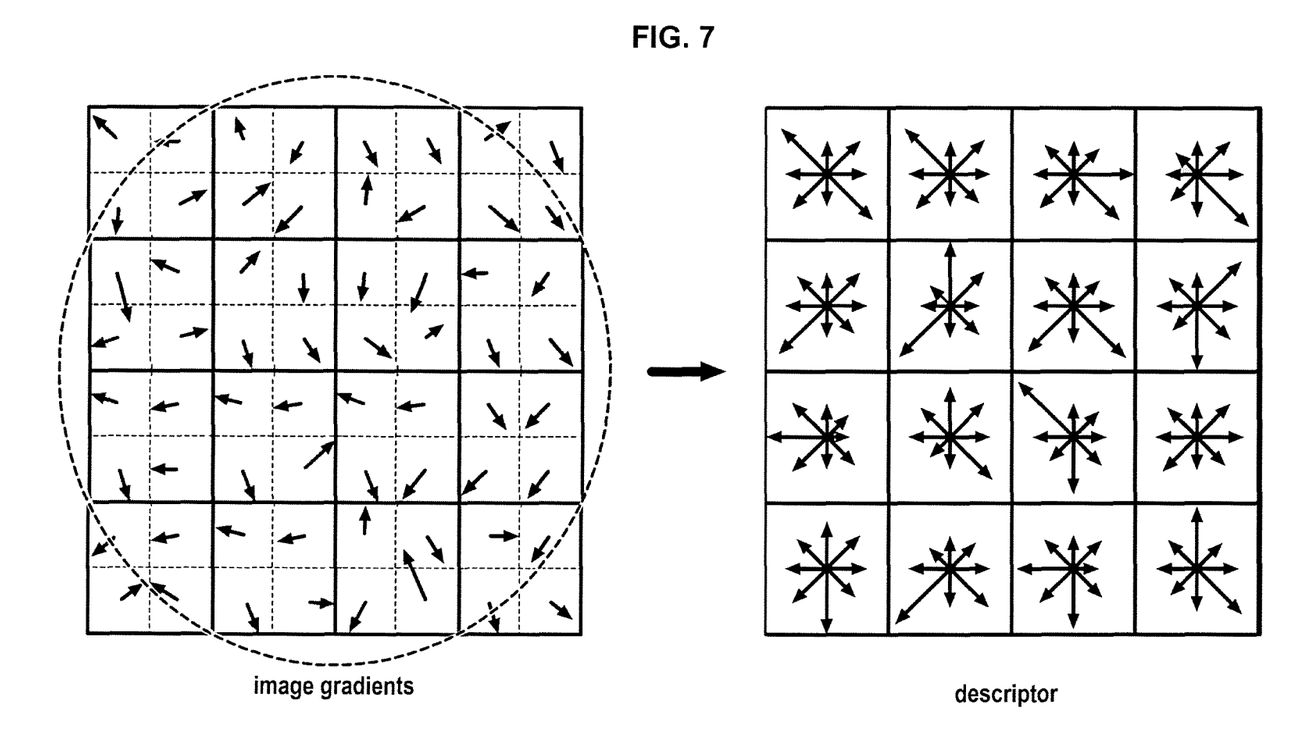
FIG. 7 shows an example of a descriptor of a sign region comprising at least one histogram of orientation of local gradients in said region according to an embodiment of the invention.

The descriptor of a sign region can in particular be of the region descriptor type, i.e. that takes into account information from the entire sign region including its content, and can include at least one orientation histogram of local gradients in said region such as shown in FIG. 7. Such a histogram shows for various directions the accumulation of the local gradients along each one of these directions in the candidate region. The calculation of the descriptor of a region can be accompanied by a subdivision of this region such as presented in the document "Lowe D. G., 1999, Object recognition from local scale-invariant features, Proceedings of the International Conference on Computer Vision, vol. 2, p. 1150-1157".

Figure 8:
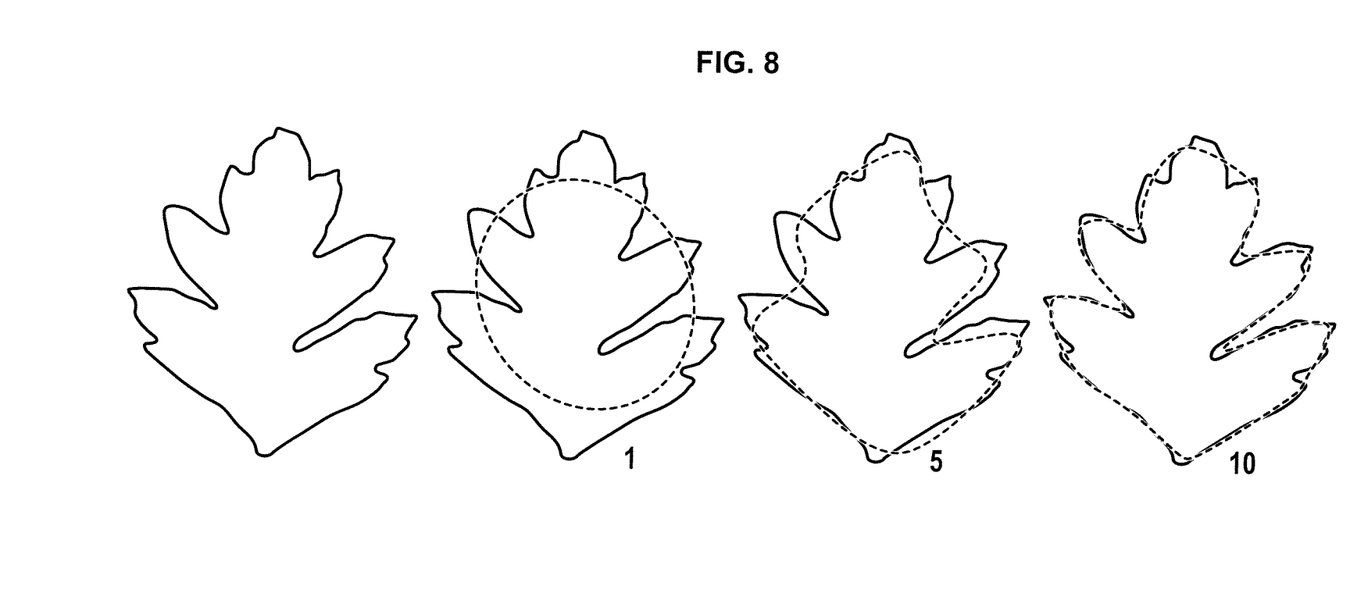
FIG. 8 shows the impact, on the precision of the description of a shape, of the number of coefficients of a Fourier transform used for defining a shape descriptor according to an embodiment of the invention.

The descriptor of a sign region can also be of the shape descriptor type and include a shape descriptor such as a Fourier descriptor of said shape, such as described in the document "Burger W. & Burge M. J., 2013, Fourier shape descriptors, principles of digital image processing, 169-227, Springer London", or a shape context descriptor such as described in the document "Belongie S., Malik J. & Puzicha J., 2002, Shape matching and object recognition using shape contexts, Pattern Analysis and Machine Intelligence, IEEE Transactions on, 24(4), 509-522". This type of descriptor can be interesting with signs that can be identified with little ambiguity thanks to their shape such as barcodes or one-dimensional OCR. Such a Fourier descriptor memorises the coefficients of a Fourier transform that describes in a more or less approached way the shape of the region. The higher the number of memorised coefficients is, the more precisely the shape is described, as shown in FIG. 8, at the price of losing robustness.

Specific descriptors can be used when the signs to be identified are geometric figures that are characterised exclusively by their contour, such as positioning marks of certain game tickets. The descriptors used can then not take into account the content information of a candidate sign region and be primarily based on the contour of such a region.

The identification device finally comprises a module for identifying 13 at least one sign, configured to identify at least one sign on at least one image of the document during a step of identifying E4 using the signatures calculated during the step of calculating E3. To do this, the module for identifying comprises a module for comparing 14 configured to compare, during a step of comparing E41, signatures of candidate sign regions calculated during the step of calculating E3 with reference signatures stored in the first storage device. These reference signatures concern sign regions of various document models. The module for comparing as such attempts to find for each candidate sign region a region of a model of the document that has a signature close to that of the candidate region. If such a putting into correspondence with a reference sign region is realised, the candidate sign region is considered as identified and corresponding to the sign of the reference sign region. Such a putting into correspondence is called "amer".

The module for identifying further comprises a module for model estimating 15 configured to estimate, during a step of estimating E42, a geometric deformation model of said document according to said comparison carried out by the module for comparing 14.

Such a deformation model can be:
- an affine model that determines an affine application that connects the candidate sign regions and the reference sign regions of the document, such as a translation, a rotation or a homothety. Such a model makes it possible to preserve the alignments of points and the ratios of distances between points of the document,
- a homographic model that determines a homographic application that connects the candidate sign regions and the reference sign regions of the document. Such a model makes it possible to have a plane of a flat surface seen by a video camera correspond with the plane of the same surface in another image,
- a model for interpolating determined using an inverse distance weighting algorithm, such as proposed in the document "Franke R., 1982, Scattered data interpolation: tests of some methods, mathematical of computation, 38(157), 181-200", and/or a splines interpolation algorithm.

The use of such deformation models and the determining of amers according to such models makes it possible to not limit the method to the taking into account of simple deformations such as perspective deformations caused by an incorrect positioning of the processed document, for example in a plane that is inclined in relation to the plane of the image capturing. As such, the method described makes it possible to take into account deformations that are much more varied and much more complex such as local deformations caused by the wrinkling of the document.

Such a model can be determined by successively implementing at least two algorithms and/or applications from among the examples mentioned hereinabove. Various algorithms can as such be tested in order to determine the best suited or the combination that is best suited for describing the deformation of the document. Various algorithms can be adapted and recorded in such a way that at least one algorithm corresponds to each type of deformation such as wrinkling, folding, bending, etc.

The step of estimating E42 and the step of comparing E41 are carried out jointly in such a way that the determining of the amers is carried out according to the corresponding deformation model.

According to a first alternative, the deformation model is determined globally from all of the determined amer combinations. The determining of correct amers can then be carried out in such a way as to minimise a criteria defined according to the chosen deformation model.

According to a second alternative during the step of identifying signs E4, the deformation model can be determined iteratively. To do this, for each candidate sign region determined in the step of segmenting E2, the step of comparing E41 can then include:

a comparison of the signature calculated for said region with said reference signatures stored in said first storage device, a putting into correspondence of the signature calculated with a reference signature according to said comparison and to a geometric deformation model of the current document stored in a second storage device 16 connected to said data processing device 2, in such a way as to identify said candidate sign region, and the step of estimating E42 can comprise:

an estimating of a new geometric deformation model of said document from said current geometric deformation model and from said correspondence, a storing in the second storage device of said new deformation model as a current deformation model.

Each putting into correspondence of a candidate sign region with a reference sign region then gives rise to an updating of the current deformation model. Each putting into correspondence can be carried out in such a way as to minimise indicators of incorrect association, such indicators that can be calculated from the current deformation model according to the coherency between the association and the current model, and/or the similarity of the descriptors of the regions put into correspondence. If, for a given candidate sign region, no reference sign region makes it possible to obtain an indicator less than a predetermined acceptance threshold, the candidate sign region can be set aside. The possible associations for this candidate sign region then seem difficult to be compatible with the current deformation model and this candidate sign region then probably corresponds to a region that comprises no sign and must not be put into correspondence with a sign region of a document model. This can for example be the case for a lottery ticket if the candidate sign region corresponds to a decorative element, not to a box.

During such iterative processing, the first candidate sign regions can by way of example be the regions of signs located at the location of the positioning marks of a reference model. The following candidate sign regions can be processed in a random order or one right after the other, according to their proximity with a candidate sign region that has already been processed.

Such an implementation makes it possible as such to identify in the image of a document that can be deformed signs such as characters or boxes, from an image of the document that may be taken remotely, without requiring a mechanical or software unwrinkling, without this identification being sensitive to the conditions of capturing the image of the document.

The invention claimed is:

1. A method for identifying at least one sign on at least one digital image of a document that can be deformed, said method being implemented by a processor able to be connected to a first storage device, said method comprising:

acquiring (E1) said at least one digital image of said document;

determining (E2) in the acquired digital image at least one sub-part of the acquired digital image, referred to as candidate sign region, using an image segmentation algorithm, for each candidate sign region, calculating (E3) a signature comprising location information in the acquired digital image, and a region descriptor concerning local characteristics of the acquired digital image in said candidate sign region, identifying (E4) at least one determined candidate sign region in the acquired digital image as a sign region, said step of identifying comprising a matching of said determined candidate sign region with a reference sign region of a document model stored in the first storage device, said matching being carried out by comparing (E41) the calculated signature of each candidate sign region with reference signatures corresponding to reference sign regions of document models, the step of identifying also comprising an estimation (E42) of a geometric deformation model of said document, wherein said matching and said estimation are carried out concomitantly, each match between one of the determined candidate sign regions and one of the reference sign regions being carried out according to the geometric deformation model of the document, said geometric deformation model being estimated as a function of previously found matches.

2. The method of identifying as claimed in claim 1, wherein for each candidate sign region:

said step of comparing (E41) comprises:

comparing the signature calculated for said candidate sign region with said reference signatures stored in said first storage device, matching the calculated signature with a reference signature according to said comparison and to the geometric deformation model of said document stored in a second storage device connected to said data processing device in such a way as to identify said candidate sign region, and said step of estimating (E42) comprises:

estimating a new geometric deformation model of said document from the current geometric deformation model and from said matching of the calculated signature with the reference signature, storing in the second storage device said new geometric deformation model as the current deformation model.

3. The method of identifying according to claim 1, wherein said document is a game ticket or an identity document.

4. The method of identifying according to claim 1, wherein the sign to be identified is a geometric figure, a character, a group of characters or a graphical element.

5. The method of identifying according to claim 1, wherein the sign to be identified is a pattern delimited by a closed contour.

6. The method of identifying according to claim 3, wherein the sign to be identified is a box, a circle, a star or an alphanumeric character or a pattern specific to an issuing country of an identity document.

7. The method of identifying according to claim 3, wherein the calculated signature of each candidate sign region further comprises scale information.

8. The method of identifying according to claim 3, wherein the region descriptor relates to information on contour and/or content of said sign region.

9. The method of identifying according to claim 3, wherein the geometric deformation model is determined using an inverse distance weighting algorithm or a splines interpolation algorithm.

10. A non-transitory computer-readable medium comprising code instructions for executing a method of identification as claimed in claim 3, when said code instructions are executed by a processor.

11. A device for identifying at least one sign on at least one digital image of a document that can be deformed, said device comprising a processor able to be connected to a first storage device, the data processing device comprising:
- a module for acquiring said at least one digital image of said document;
- a module for determining in the acquired digital image of said document at least one sub-part of the acquired digital image, referred to as candidate sign region, using an image segmentation algorithm,
- a module for calculating a signature for each candidate sign region comprising location information in the acquired digital image of and a region descriptor concerning local characteristics of the acquired digital image in said candidate sign region,
- a module for identifying at least one sign region on said at least one digital image of said document among the determined candidate sign regions, said module for identifying being configured to match a determined candidate sign region with a reference sign region of a document model stored in the first storage device, by operation of a module for comparing the calculated signature of each candidate sign region with reference signatures corresponding to reference sign regions of document models, said module for identifying also comprising a module for estimating a geometric deformation model of said document, wherein said matching and said estimation are carried out concomitantly, each match between one of the candidate sign regions and one of the reference sign regions being carried out according to a current geometric deformation model of the document, said current geometric deformation model being calculated as a function of previously found matches.

* * * * *